UNITED STATES PATENT OFFICE.

WERNER SCHULTZ, OF CHARLOTTENBURG, GERMANY.

BACTERIAL PRODUCT.

1,005,077.        Specification of Letters Patent.        Patented Oct. 3, 1911.

No Drawing.      Application filed January 18, 1910. Serial No. 538,666.

*To all whom it may concern:*

Be it known that I, WERNER SCHULTZ, a subject of the Emperor of Germany, residing at Charlottenburg, near Berlin, Germany, have invented certain new and useful Improvements in Bacterial Products; and I do hereby declare the following to be a full, clear, and exact description of the invention, such as will enable others skilled in the art to which it appertains to make and use the same.

The subject of my invention is a process of obtaining a liquid preparation for diagnostic and curative purposes.

According to my invention the pure cultures of bacilli and a culture medium are submitted to evaporation and to the concentrated liquid, after the mass of bacilli has been filtered off, there is added an iron compound, such for instance as iron oxychlorid. The precipitate thus obtained is washed till free from chlorin and albumin, and then dissolved in diluted soda lye.

A reaction takes place between the active principles of the extract formed by the evaporation and the iron salt. This tuberculin is a solution of the iron albumin obtained as a precipitate on adding an iron compound to the culture medium which has been evaporated to its tenth part. This method is particularly suitable for preparing tuberculin and has the advantage that the product is essentially purer than tuberculin as hitherto prepared. By means of the present invention, on the other hand, I obtain a preparation free from the said by-products, and employ an inorganic ingredient in order to render the product more suitable for certain medico-clinical uses.

A specific example showing definite amounts of ingredients used in the process is given in the following: The nutritive solution is concentrated to the tenth part of its volume, and filtered to remove the bacilli hereafter a solution of iron oxychlorid of 12% is added to 10 cubic centimeters of the concentrated liquid the quantity of the iron oxychlorid which is added varying between 90 and 120 cubic centimeters. Hereupon the precipitate is washed till free from chlorin and albumin and dissolved in dilute soda lye of 1% at an amount of 30 to 50 drops, adding such a quantity of a mixture of water and 25% glycerin that the resulting liquid amounts 40 cubic centimeters.

What I claim is—

The process of obtaining a preparation for diagnostic and curative purposes, according to which the pure cultures are evaporated with the culture medium, whereupon the concentrated liquid is filtered to remove the bacilli mass, and an iron compound added to it, after which the precipitate is washed, and dissolved in soda lye, substantially as described.

In testimony whereof I affix my signature in presence of two witnesses.

WERNER SCHULTZ.

Witnesses:
    HUGH GRAMATKI,
    LARAPED BEISHAN.

Copies of this patent may be obtained for five cents each, by addressing the "Commissioner of Patents, Washington, D. C."